United States Patent
Herceg et al.

(10) Patent No.: US 10,291,655 B2
(45) Date of Patent: May 14, 2019

(54) USER INTERFACE FOR TIERED ACCESS TO IDENTIFICATION DOCUMENTS

(71) Applicant: MorphoTrust USA, LLC, Billerica, MA (US)

(72) Inventors: Thomas Jay Herceg, Amherst, NH (US); Laura Levan Harley, Haverhill, MA (US)

(73) Assignee: MorphoTrust USA, LLC, Billerica, MA (US)

( * ) Notice: Subject to any disclaimer, the term of this patent is extended or adjusted under 35 U.S.C. 154(b) by 159 days.

(21) Appl. No.: 15/397,383

(22) Filed: Jan. 3, 2017

(65) Prior Publication Data
US 2017/0195367 A1    Jul. 6, 2017

Related U.S. Application Data

(60) Provisional application No. 62/273,976, filed on Dec. 31, 2015.

(51) Int. Cl.
*H04L 29/06* (2006.01)

(52) U.S. Cl.
CPC .............. *H04L 63/20* (2013.01); *H04L 63/08* (2013.01); *H04L 63/101* (2013.01)

(58) Field of Classification Search
None
See application file for complete search history.

(56) References Cited

U.S. PATENT DOCUMENTS

| 7,639,837 | B2 | 12/2009 | Carr et al. |
| 7,882,032 | B1 * | 2/2011 | Hoffman ............. G06F 21/6218 705/50 |
| 8,059,858 | B2 | 11/2011 | Brundage et al. |
| 8,135,656 | B2 | 3/2012 | Evanitsky |
| 9,058,515 | B1 * | 6/2015 | Amtrup .................. H04N 1/387 |
| 2002/0099959 | A1 * | 7/2002 | Redlich ................. G06F 21/554 726/23 |
| 2003/0051054 | A1 * | 3/2003 | Redlich ............... G06F 21/6209 709/246 |

(Continued)

OTHER PUBLICATIONS

Ghanea-Hercock, Robert. Phobos: An Agent-Based User-Authentication System. IEEE Intelligent Systems, vol. 18, Issue: 3. https://ieeexplore.ieee.org/stamp/stamp.jsp?tp=&arnumber=1200732 (Year: 2003).*

(Continued)

*Primary Examiner* — Jeremiah L Avery
(74) *Attorney, Agent, or Firm* — Fish & Richardson P.C.

(57) ABSTRACT

Examination stations may be dynamically reconfigured in response to detecting a fault condition. Specifically, a state of the workflow for the document issuing authority may be determined and a fault condition within the workflow for the document issuing authority may be identified. A processor identifies a dynamically reconfigurable workstation within the document issuing authority in the able to respond to the fault condition; and generates a reconfiguration instruction for the dynamically reconfigurable workstation, the reconfiguration instructions associated with a condition that was specified based upon identifying the fault condition.

14 Claims, 10 Drawing Sheets

(56) References Cited

U.S. PATENT DOCUMENTS

| | | | |
|---|---|---|---|
| 2005/0138110 A1* | 6/2005 | Redlich | C07K 14/70575 709/201 |
| 2006/0021019 A1* | 1/2006 | Hinton | G06F 21/41 726/10 |
| 2007/0061393 A1* | 3/2007 | Moore | G06F 17/3089 709/201 |
| 2007/0106754 A1* | 5/2007 | Moore | G06F 17/3089 709/217 |
| 2007/0162308 A1* | 7/2007 | Peters | G06F 19/328 705/2 |
| 2007/0219826 A1* | 9/2007 | Brodsky | A61M 1/387 705/2 |
| 2008/0156869 A1 | 7/2008 | Carr et al. | |
| 2008/0222734 A1* | 9/2008 | Redlich | G06F 21/577 726/26 |
| 2009/0019552 A1* | 1/2009 | McLaughlin | G06Q 30/0203 726/27 |
| 2014/0075004 A1* | 3/2014 | Van Dusen | H04L 41/04 709/223 |
| 2015/0067344 A1 | 3/2015 | Poder et al. | |
| 2015/0142662 A1 | 5/2015 | Crabson | |
| 2015/0269433 A1* | 9/2015 | Amtrup | G06Q 20/3276 382/115 |

OTHER PUBLICATIONS

Steele, Robert. A Web Services-based System for Ad-hoc Mobile Application Integration. Proceedings ITCC 2003. International Conference on Information Technology: Coding and Computing. https://ieeexplore.ieee.org/stamp/stamp.jsp?tp=&arnumber=1197535 (Year: 2003).*

* cited by examiner

USER INTERFACE FOR TIERED ACCESS TO IDENTIFICATION DOCUMENTS

CROSS-REFERENCE TO RELATED APPLICATIONS

This application claims priority to U.S. Application No. 62/273,976, filed Dec. 31, 2015, and entitled "A User Interface for Tiered access to Identification Documents." This application is incorporated by reference in its entirety.

BACKGROUND

A document issuing authority is tasked with administering different systems in order to produce an identification document. For example, a document issuing authority may feature registration systems, biometric enrollment systems, imaging stations, testing systems, medical compliance systems, and printing systems.

DETAILED DESCRIPTION

Issuing identification documents such as driver's licenses can be a problematic task. First, complex issuing requirements often require different systems to be linked. For example, the workflow may require biometric databases to be linked with background databases, legal administration systems, as well as on-site printing, photographic, laminate, and testing systems. The challenges become more complex as administrators administer various queues and repurpose staff and administrative systems in order to accomplish operating requirements and better manage the demand for identification card services. Further, the systems and workflow often must be maintained across various system failures where one or more constituent components are partially or wholly nonoperative. Further, sometimes drastic personnel turnover means that training modes on these systems may be dynamically invoked in order to facilitate training of a new person. Finally, using electronic systems to conduct investigations and deter fraud impose greater burdens on the processing infrastructure.

In some environments, policies and enforcement of rules may vary from office-to-office even within the same state. In addition, while there may be some guidelines and regulations (e.g., RealID), rules may vary or be altered between states. Thus, an administrator (e.g., a facility supervisor) would desire to modify rules responsive to pressing objectives.

For example, a supervisor may manage a team of 20 examiners at a branch of a state agency. Different examiners may have different titles, dockets of investigations and tasks, different permissions, and different responsibilities. An examiner's workstation may be configured to support a profile that reflects different responsibilities. As an examiner is reassigned from a first workstation to a second workstation, the examiner's docket may "move" with the examiner to the second workstation. However, a supervisor also may elect to reassign dockets in order to task the examiner with pressing needs. In some configurations, the examiner acquires a new docket of tasks and/or permissions consistent with this reassignment. In other configurations, the examiner acquires a new docket in addition to a legacy docket. These tasks and dockets may be loaded to a new workstation for the examiner. A first role may include a first set of permissions where the examiner is not allowed to approve exceptions. A second role may include different permissions that allows a modest range of discretion to approve a first class of exceptions. Still, other configurations allow an examiner to assume a supervisory role relative to other examiners where the examiner can approve exceptions sought by other examiners.

In some instances, the administrator is managing consumer-facing examiners charged with issuing identification documents. In other configurations, the administrator is managing a team of investigators in a "back office" environment through a workflow process required to perform different constituent tasks ("gates) required to issue an identification document. The workflow may be coupled to printers and other supply-chain intensive systems where the performance of a physical system, such as a printer, impacts the performance of a queue and a workflow. While some identification document issuing authorities feature consumer facing cameras and printers, recent objectives in identification document management systems are compelling agencies to rely upon more sensitive and sophisticated central printers (in addition to other gear). The inventory of such systems and the underlying supplies may carry national security and criminal implications where the loss or interruption of any such gear (e.g., ink, cards) may trigger a criminal investigation. As a result of these and additional factors, the administrator's tool may be coupled to account for the impact of supply chain issues on the queue. For example, the system may track the transition of an identification document from an investigatory queue into the transition for printing, issuance, and shipping.

Many of the rules reflect state and federal rules and regulations based upon applicable laws. Some of the provisions can be waived while other provisions cannot be overridden. Still other provisions require a designated level of supervisory authorization in order to override an identified rule/issue. The rule engine may include common components that are employed across multiple jurisdictions (e.g., states and/or with the Federal Government) while enabling a degree of per-site or per jurisdiction customization that allows the administrator themselves to specify criteria that will control the system and underlying workstations. In one configuration, the rules are designed and loaded by an administrator in order to achieve a degree of nonrepudiation. That is, the system may be configured to document the creation and invocation of specified rules by a particular user identity and have not been enacted on an administrator's behalf by an Information Technology administrator. Thus, a computer system that can dynamically invoke different configurations across a complex distributed environment may be used to maximize the efficiency of limited computational processing resources while also addressing some of the challenges associated with the complex task of issuing identification documents.

Figure 1:
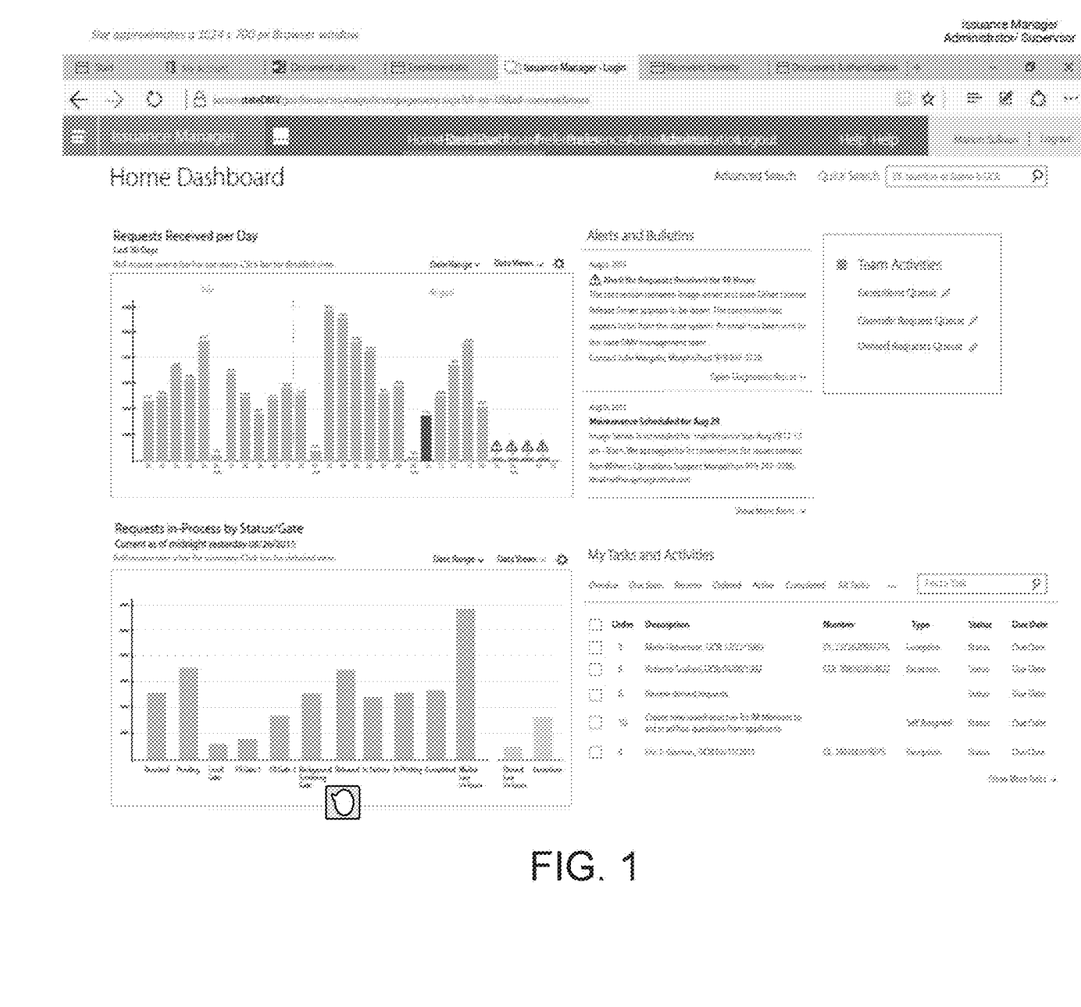
FIG. 1 is an example of a user interface of an administrator's station that illustrates how an administrator may perceive status information of the underlying production of identification documents.

FIG. 1 is an example of a user interface of an administrator's station that illustrates how an administrator may perceive status information of the underlying production of identification documents. In particular, FIG. 1 illustrates the current state of the queue and production by day in a manner that allows an administrator to select and click on the performance of a day and/or situation in order to retrieve more information about the performance of a gate (e.g., issuing station such as a camera used in a state Department of Motor Vehicles or a bank underwriting department). The administrator may select or click on a data point in the queue in order to retrieve more detailed information as to the source of a delay or problem. For example, a faulty camera or inoperative biometric serve may require an administrator override in order to allow issuance of a driver's license before biometric background check may be completed. In addition to overrides, the user interface may allow the administrator to schedule and/or perceive the status of repairs, activate/reconfiguring additional systems in order to make up for the loss of an inoperative system and/or allow for an administrator to route a transaction (e.g., a request for a document that cannot be readily addressed) to a troubleshooting workstation in order to not delay processing of uncomplicated tasks. The troubleshooting workstation may possess better equipment (e.g., a more detailed camera) and/or more senior permissions required to authorize exceptions. For example, while it may not be possible to issue a long term identification document, a specialist workstation may be configured to issue a temporary permit along with a specialized checklist required of the applicant in order to remove the "hold" on the record that precludes long term issuance of the certificate.

A number of states have employed reconfigurable kiosks designed to serve multiple purposes. Some of the kiosks may include optical scanners designed to read in and reference renewal paperwork, cameras used to generate updated pictures of users, and printers that issue temporary or permanent permits. The kiosks may be configured to also support testing, receive payment, and/or perform constituent tasks that are part of the workflow. The administrator's tool described herein may be used to dynamically manage the configuration of these tasks in a way that allows the administrator to better address changing workflow.

In one aspect, the shown gate represents a constituent task in a sequence of steps required to issue an identification document (or other credential). For example, a law enforcement authority may perform a multi-tiered credential process in order to issue a law enforcement badge. One or more tasks may be performed by back office personnel that perform critical background investigations and training certification required before any credentials or badge can be issued. Still, the ability to process, track, and manage these back office tasks may adversely impact the ability of the issuing authority to timely deliver required credentials. Thus, the administrator tool may use the tasks shown to tack and manage workstations and dockets required to support the back office requirements in addition to the management of printing and imaging systems.

Figure 2:
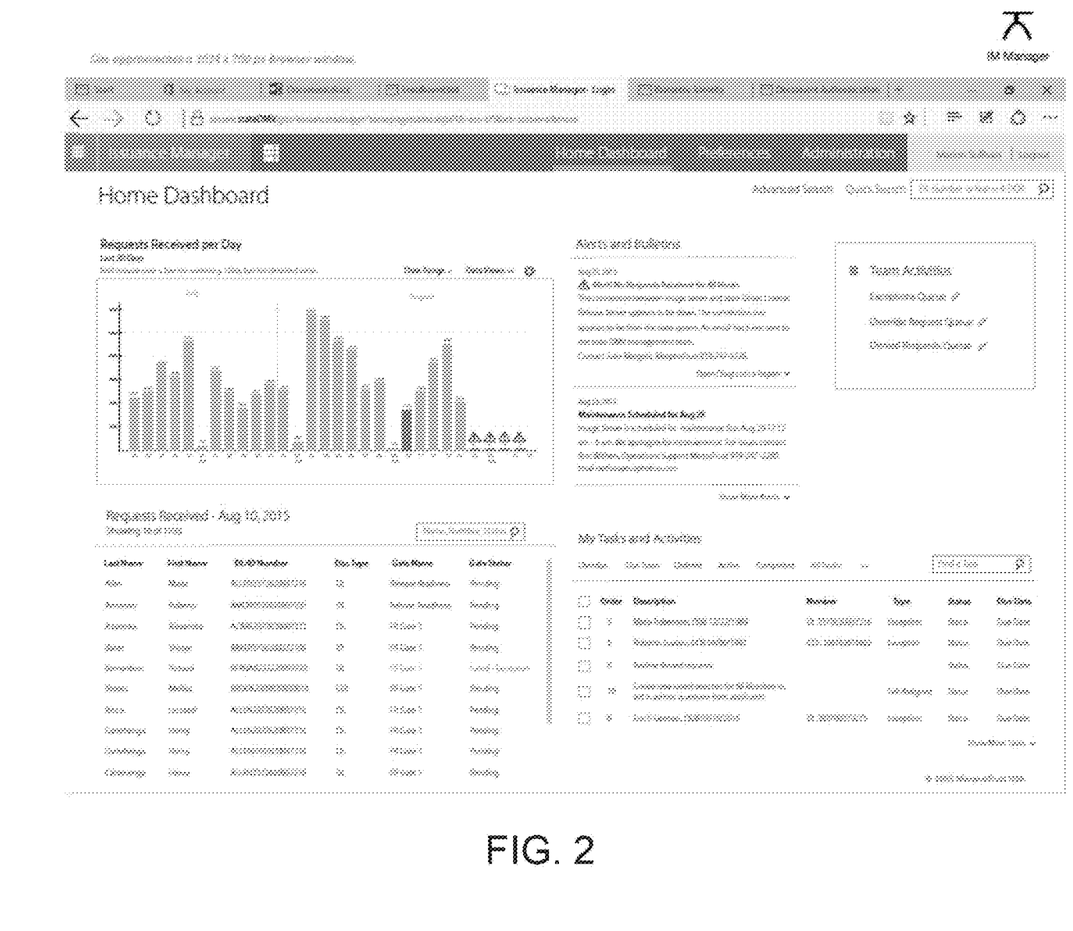
FIG. 2 illustrates a different user interface that allows a user to perceive pending tasks in addition with respect to particular documents in addition to allowing the administrator to perceive overall production levels.

FIG. 2 illustrates a different user interface that allows a user to perceive pending tasks in addition with respect to particular documents in addition to allowing the administrator to perceive overall production levels. The administrator may perceive the day-day production and use the data to reconfigure tasks and/or schedule maintenance. For example, certain printing modules may require scheduling on a specified basis. The user interface also shows a list of tasks that involve the additional investigations and/or require approval of an exception. One example of an exception may include a person unable to participate as set forth by the issuing authority, for example, because of a medical condition that requires the use of authorized proxies to execute transactions on behalf of an infirm person.

Figure 3:
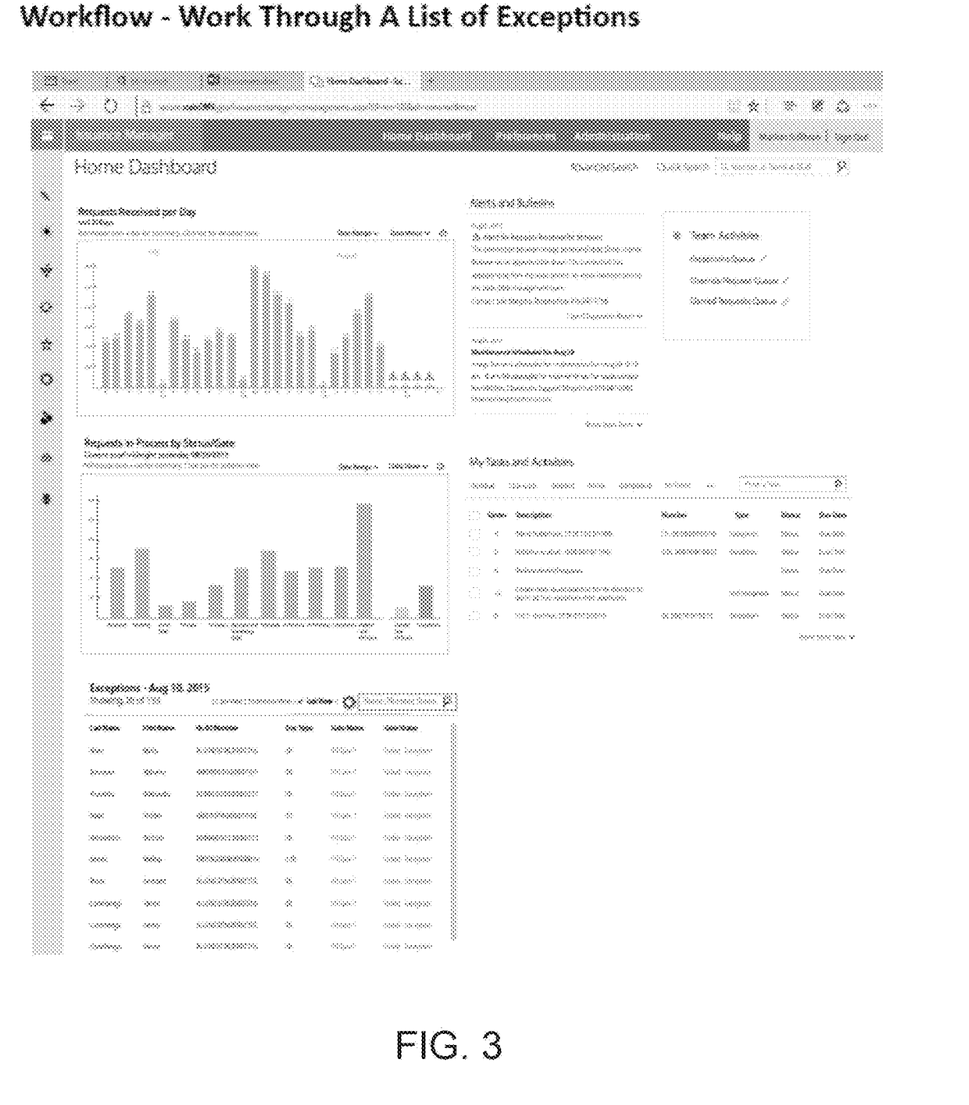
FIG. 3 is a figure of a process by which exceptions are handled.

FIG. 3 is a figure of a process by which exceptions are handled. In particular, FIG. 3 illustrates a user interface that an administrator can use to investigate exceptions and task the exceptions to a remote agent for a field agent to investigate. An administrator may select or double-click on one or more of the exceptions and then reassign the tasks to a remote user that then places the identified task in the list of tasks assigned to a remote user (e.g., a DMV employee that performs one or more tasks within the constituent queue).

Figure 4:
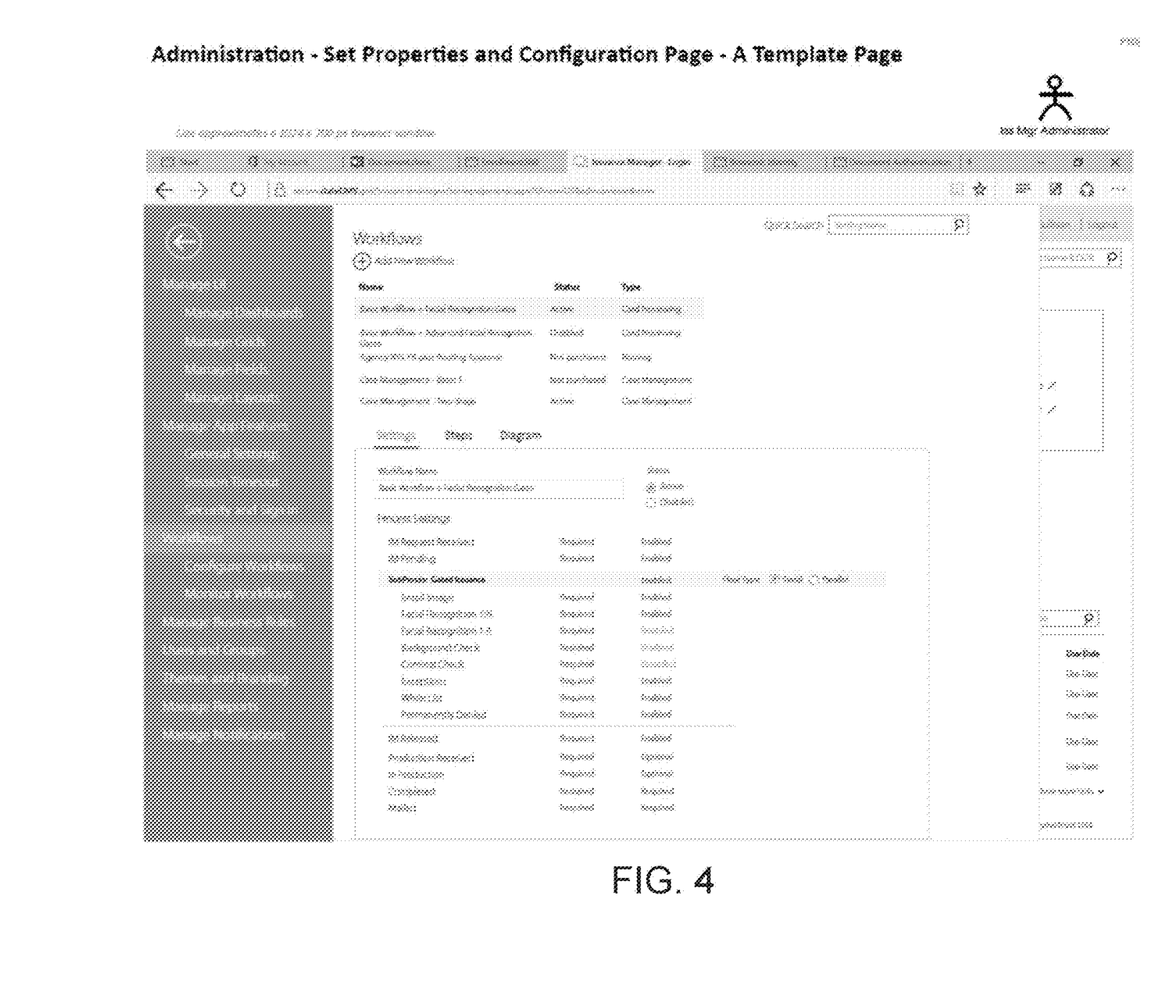
FIG. 4 illustrates a process by which a workflow involving workstations and issuing equipment can be managed through an administrator's workstation.

FIG. 4 illustrates a process by which a workflow involving workstations and issuing equipment can be managed through an administrator's workstation. In particular, FIG. 4 illustrates how different workflows and/or profiles can be created in order to invoke automated settings for particular queue management systems and/or terminals. As shown, FIG. 4 provides workflows for:

Basic Workflow+Facial Recognition Gates—Processes are configured to both facilitate enrollment in both biometric systems as well as authentication through existing regimes.

Basic Workflow+Advanced Facial Recognition—Processes are configured to both facilitate enrollment in both biometric systems as well as authentication through existing regimes. In some configurations the advanced facial recognition designation includes a designation that the newly-captured imagery should be incorporated into a database running more advanced algorithms. Note that in some configurations, the system is comparing templates descriptive of the underlying imagery and not actually comparing or storing the underlying images. Such a configuration may be deemed advantageous in better protecting personally identifiable information. In other configurations, both the biometric template and the underlying imagery is used.

Case Management–Two-Stage Active—Processes are configured to include both a first stage required to populate a template of a user's profile as well as follow up work required to confirm the existence of information previously populated and also review any exceptions that have been authorized.

Case Management–Basic 1—Processes are configured to include only a first stage required to populate a template of a user's profile. Such a configuration may include temporary registration required to perform tasks that include:

Agency XYX plus Routing Approval—Processes are configured to include specialized agency processes and required authorization. For example, identification documents used by law enforcement officials that are given special access to evidence rooms, a task deemed very sensitive, may require additional routing in order to validate higher degrees of required credentialing.

The user interface also enables an administrator to specify settings that allow the administrator to designate whether one or more parameters apply. This can include settings for:

White List—Approval of a designated user is favored and/or approved based on existence of a user's name or profile in an authorized white list. For example, an emergency room physician may be credentialed for access to sensitive areas in times of emergency irrespective of whether flags or concerns exist.

Criminal Check—Designates whether approval of a criminal check is required before a specified form of an identification document can be issued.

Background Check—Designates whether approval of a background check is required before a specified form of an identification document can be issued. This can include safeguards that designate whether a user has turned up in other databases and/or whether certain flags are found to exist in the user's background.

Facial Recognition 1:R—Designates whether a first degree of biometric authentication or participation is required in order to permit the designated level of authentication.

Facial Recognition 1:N—Designates whether a second degree of biometric authentication or participation is required in order to permit the designated level of authentication.

Figure 5:
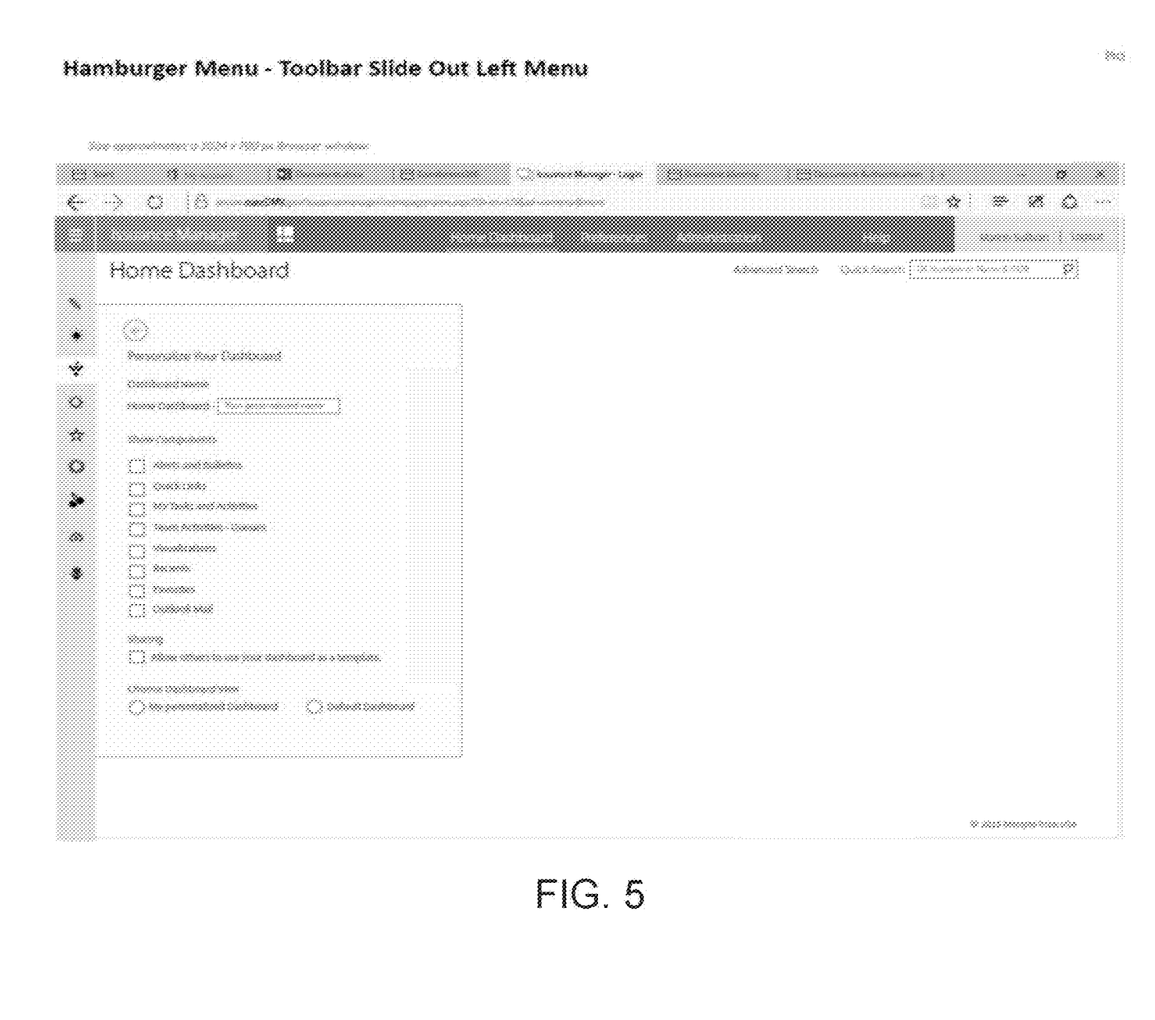
FIG. 5 includes an administrator's tool configured to allow differing degrees of alerts and/or notifications to be generated on a particular user interface.

FIG. 5 includes an administrator's tool configured to allow differing degrees of alerts and/or notifications to be generated on a particular user interface. Among other tasks, the user interface shown in FIG. 5 allows different back office and messaging applications (e.g., email in Outlook) to be coupled to existing workflow processes. In one configuration, a description of problematic workflow configuration can be automatically captured and described and routed to a manager for consideration using an interface that allows an administrator to select from one of several reconfiguration options.

Figure 6:
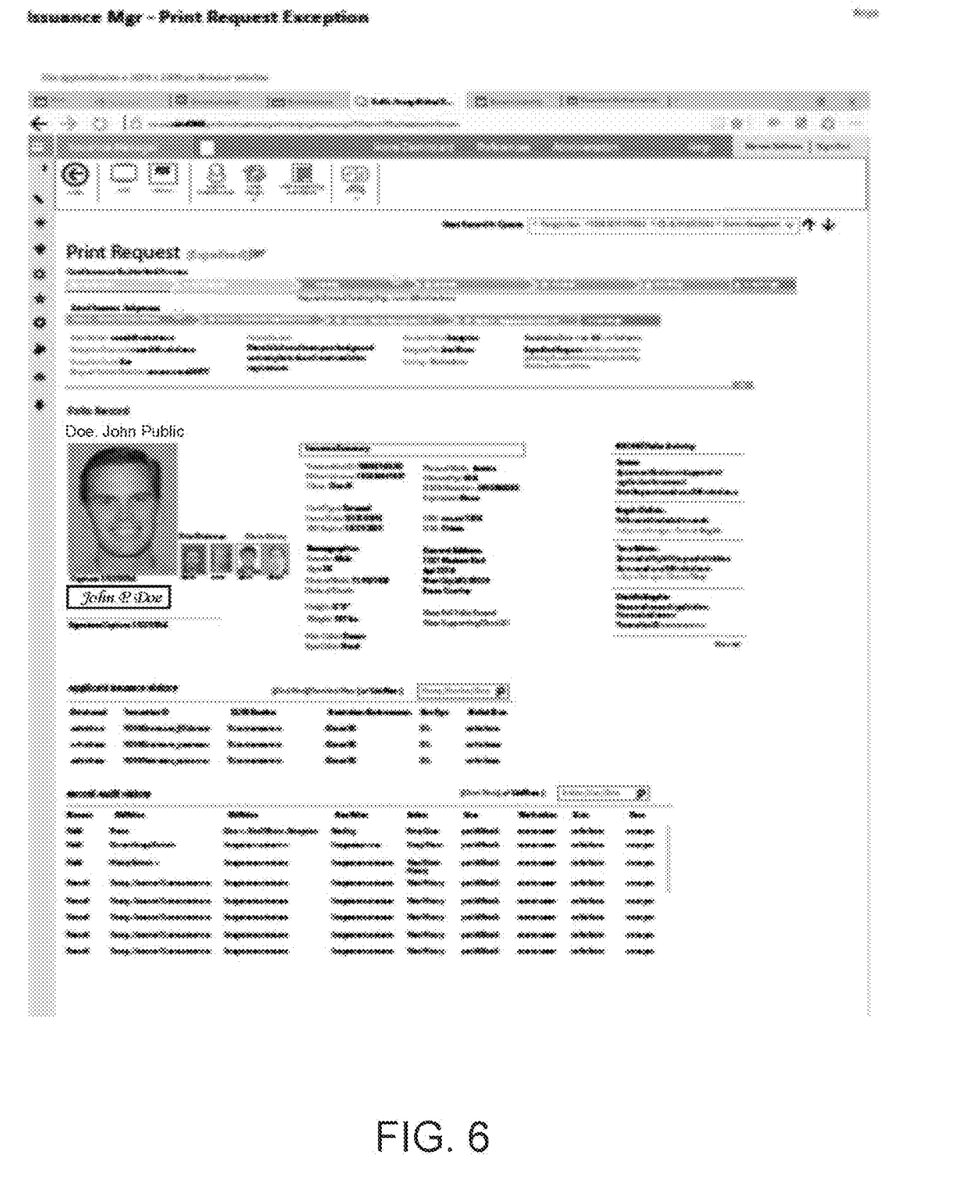
FIG. 6 includes an investigatory tool that allows a user to ascertain the status of a designated application.

FIG. 6 includes an investigatory tool that allows a user (e.g., a DMV employee) to ascertain the status of a designated application. In particular, FIG. 6 illustrates where an application or request for an identification document exists in the process. If a task or constituent task fails one or more checks, the display shows which particular check has failed. The status and impact on an examiner and/or workstation's docket also may be modified to reflect the larger systemic status in a manner that allows an administrator to reconfigure workstations and repurpose staff in order to address resultant issues. An administrator then may investigate the exceptions, specify tasks based on the identified failures and issue one or more authorizations (or requests for exceptions) based on the identified failures. In one configuration, an administrator may design and invoke new rules designed to better support management objectives and maintain productivity requirements in the face of alarms that address criteria determined to be invalid, inaccurate, or that may be waived.

Figure 7:
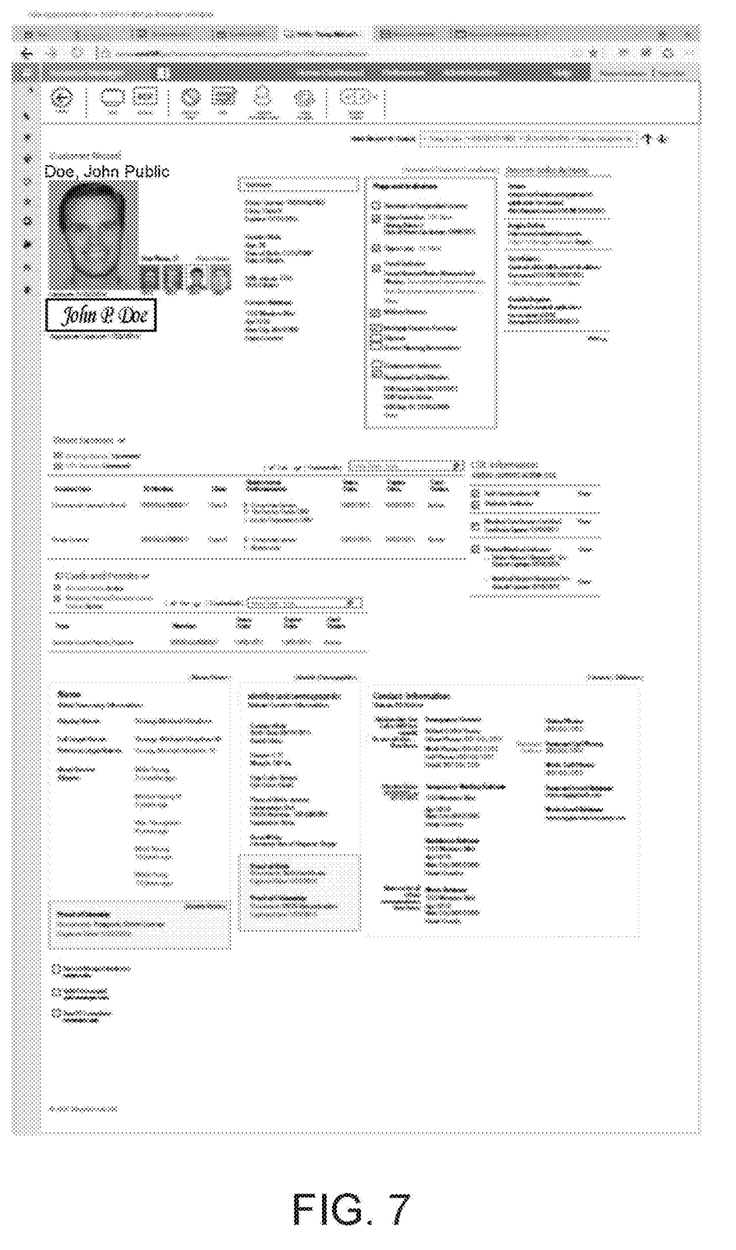
FIG. 7 illustrates how the investigatory tool shown with respect to FIG. 6 may be modified to further allow the user to code and or designate one or more parameters that further modify a user's record with a licensing authority and/or modify an identification document itself to reflect one or more permissions and aspects of the user's profile.

FIG. 7 illustrates how the investigatory tool shown with respect to FIG. 6 may be modified to further allow the user to code and or designate one or more parameters that further modify a user's record with a licensing authority (e.g., a state issuing driver's licenses) and/or modify an identification document itself to reflect one or more permissions and aspects of the user's profile. Among other designations, the tool shown in FIG. 7 allows an administrator to designate medical information (e.g., information related to a medical condition) and also to document and describe the additional work that was performed. As shown, the administrator has generated an electronic record that specifies that second level review has failed based on discrepancies between earlier photographs and the current photographs. The second level review may itself be used as the basis with which an application is denied. However, the second level of review also may be used on association to generate alarms relative to emerging thresholds. For example, inconsistent photographs may not rise to the level of alarm required to deny a future application. However, the use of inconsistent photographs in association with a suspicious financial profile and/or criminal history may become the basis to generate an alarm that is issued as the issuance process is interrupted.

Figure 8:
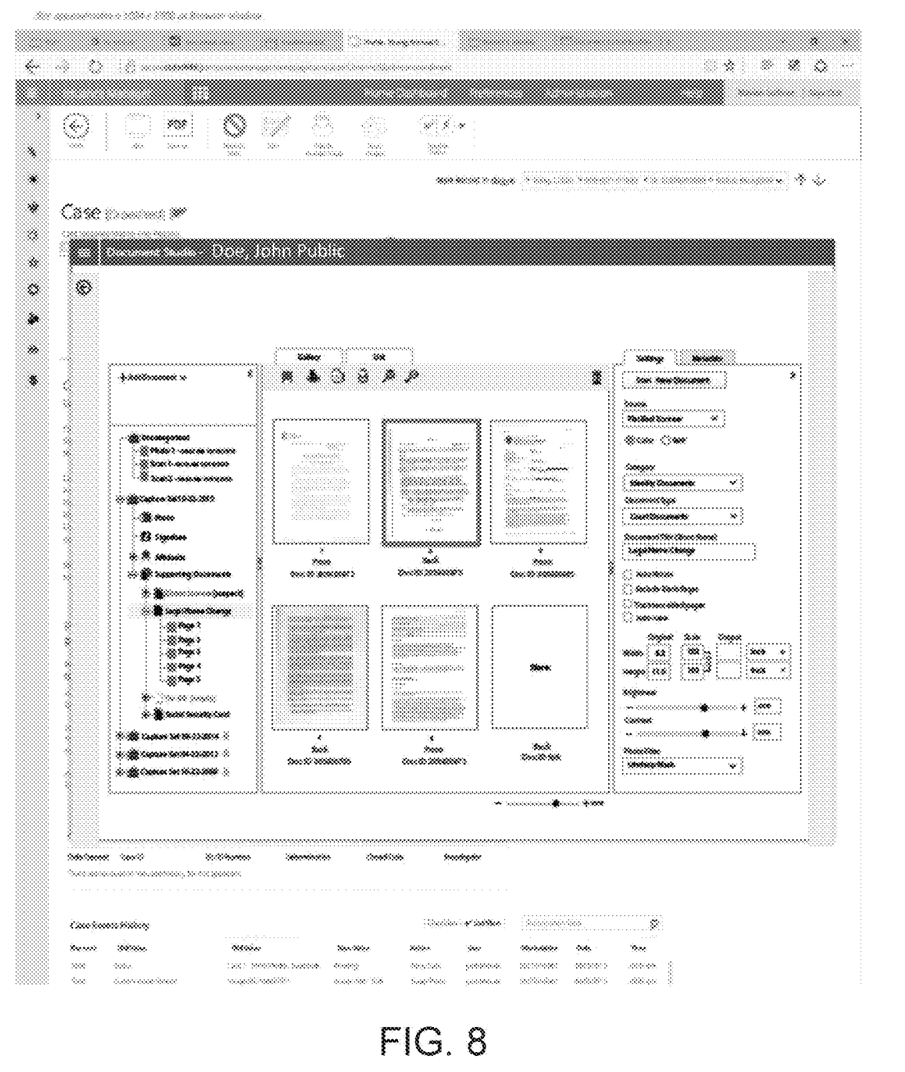
FIG. 8 illustrates a tool by which an administrator can generate a database record required to respond to exceptions.

FIG. 8 illustrates a tool by which an administrator can generate a database record required to respond to exceptions. For example, legalizing a name change often requires proof of prior names and a variety of supporting documentation. The tool shown in FIG. 8 allows an administrator to package the required documentation in a way to first establish legitimacy of the request and enable subsequent access in the event that later investigation of this information is required.

Figure 9:
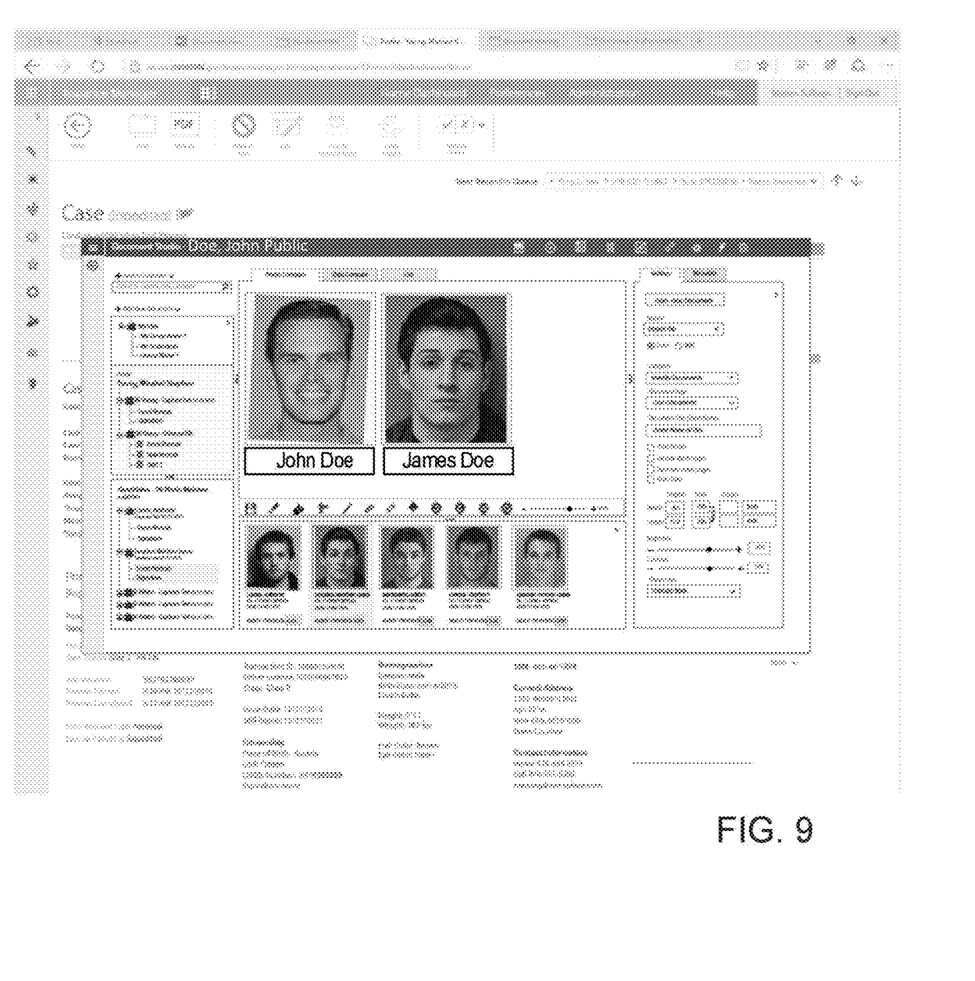
FIG. 9 illustrates a tool that enables an administrator to perform an investigation of particular identities and photographic identities relative to other similar photographic and identification data.

FIG. 9 illustrates a tool that enables an administrator to perform an investigation of particular identities and photographic identities relative to other similar photographic and identification data. As shown, the user interface shown in FIG. 9 illustrates how images being compared relate to other existing users appearing in the dB. The similarity of images is shown in the similar documents.

Although many of the operations described above were described in the context of a identification document issuing authority, such as a state DMV, the operations also may be performed in order validate existing identification documents. The operations also may be performed in other realms. For example, an airport authority and/or passport authority may reconfigure existing workstations (e.g., a passport or customs inspection station) using the operations described above. An airport administrator acting on behalf of a customs authority may detect a problematic workflow. As a result, the airport administrator may reconfigure inspection stations configured to support a first task (e.g., agriculture inspection) into a second task (e.g., general inspection).

Similarly, a hospital may credential different health care providers and caregivers with different credentials. A hospital administrator may implement security and access control procedures designed to limit personal access to one or more areas and/or one or more associated pieces of equipment (e.g., medical diagnostic gear on which the individual is certified). However, in times of medical necessity, an administrator may authorized and approve one or more exceptions in order to respond to existing medical needs. The identification document may specify credentials and/or authorizations that are reconciled with existing databases that allow an administrator to readily verify the specified credential. As new equipment or systems are unveiled, the administrator may authorized a broader and inclusive credentialing policy as early stage installations may not accurately reflect actual authorization during the transition period associated with the adoption of new systems.

A number of jurisdictions are employing and linking larger and integrated databases that link tax, motor vehicle, and real estate records. The availability of such a large amount of information may require administrators to enforce detailed and restrictive profiles designed to prevent examiners from improperly viewing sensitive and unauthorized information. The administrator may design examiner profiles and audit policies that not only prevent such unauthorized access, but also generate a summary of activity that allows an administrator to perceive any potentially concerning activity as a precaution.

In some configurations, these larger/linked databases are linked to outside commercial systems where an examiner has a profile that both tasks the examiner to use the commercial database and also restricts examiner activity within the database to limit visibility into authorized activity.

The administrator's tool may be configured to support financial institutions such as a bank's underwriting department. The tools may be used to perform the necessary investigatory and cross-correlation in order to authorized a loan or credit card transaction.

The displays may be configured to assist users with contextual search. For example, a user investigating a potentially fraudulent application in a first area and associated with a particular identity may be presented with "known associates" of the investigation and/or applicant target. Similarly, the user may be presented with results that prioritize the user's prior work and activities on behalf of an agency.

The user's workstation may be configured to automatically receive information updates based on the user's task and role. For example, a user's workstation may be processing multiple applications in different stages of processing. The user's display may receive status information in real-time across a status bar showing all open tasks as the coordinating agency receives responsive updates from partnered remote systems.

In one configuration, an administrator may task examiners to a field location, for example, responsive to disaster relief. For example, a government agency may be trying to generate emergency credentials to one or more users affected by a natural disaster. An administrator at a government agency may be attempting to issue emergency documentation for those affected by a flood. Given the dynamic environment in which infrastructure may be unavailable and varying degrees of field capability become available in an ongoing basis, an administrative application may be used to rapidly dispatch examiners to issue emergency credentials to affected populations. For example, the administrative application may be used to activate a field enrollment application on a mobile device for examiners. The field application may be accredited to offer access to required government databases used to issue credentials. The field application also may invoke a trusted configuration so that illicit applications do not attempt to access sensitive or PII (Personally identifiable information). This problem may be particular acute where access to PII in medical records are controlled by federal privacy law (e.g., HIPAA).

An examiner responding to such a field tasking may first receive a remote message an activation request from the administrative application. The responding examiner may receive this request, send an acknowledgement and/or authentication message, and then use a navigation application associated with the activation request in order to navigate to an affected area. Once entering the affected area, the field examination application may enter an "activated" state whereby the examiner is allowed to enroll users into an "affected users" system.

The administrative application may selectively invoke one or more constituent components depending on the needs of the disaster. In some instances, an examiner may initially be asked to register affected users for additional processing that may be required after next steps have been determined. For example, a field examiner may be dispatched to an emergency relief center located at a school. Once users have been enrolled, the affected users may become eligible for medical care and/or disaster relief benefits. The field application may be initially configured to only enroll users by collecting biographical information, contact information, and an image. The field application also may be configured to reconcile this information with issuance databases in order to specify a confidence level should additional actions be required.

Once a decision is made that affected persons are eligible for disaster relief benefits, the field application may be configured to enroll users for benefits. For example, if the affected user is enrolled using a temporary (or permanent) digital driver's license resident on a wireless device along with confederated applications configured to interface with the digital driver's license, the field application may be configured transfer funds so that the bearer of the wireless device may use the wireless device to support one or more financial service transactions.

If medical care is required, an emergency medical records application may be invoked so that affected users may receive medical care in a field environment. The field application may be configured to receive input from on-scene medical providers, or to instantiate a record that can then be transmitted to medical providers and/or the affected users.

In some instances, temporary driver's licenses may need to be issued to affected users. The administrative application may compel invocation of a security and accreditation suite so that all actions can later be forensically be reviewed to ensure accuracy and combat fraud. For example, it may be imperative to issue some form of identification immediately, even if the enrollment process satisfies less than all required elements. An affected user receiving medical care may be incapable of completing or providing the required information. The administrative application may be configured to issue a temporary identification document that expires after a specified period of time. The administrative application may install a logging application on a field application so that all issued identification documents can be identified, and later revoked (especially for issued digital driver's licenses). The administrative application also can limit access to records on centralized databases so that the field application can only access records where a user's access can be identified and/or authenticated.

Should an accredited printer be deployed to a field environment, the field application may be configured to generate a print queue such that previously enrolled users can then later receive a printed/fabricated electronic document. The printing and receipt of an identification document also may be associated with the revocation of a digital driver's license. For example, the field application may capture biometric information that is captured when an affected user is initially registered. The examiner may use a wireless device to capture fingerprint, facial imagery, and liveness information. Once enrolled, a user may receive a temporary identification document application on a wireless device. The affected user then may receive an alert once an accredited field printer arrives on site and is able to print identification documents. The affected user then may visit the printing station and present themselves for biometric authentication in order to receive a physical identification document. The temporary digital driver's license then may be electronically revoked once deliver of the physical identification document is confirmed.

Of course, these field deployments need not be limited to natural disasters or emergencies. A government agency may elect to pursue field examination and enrollment in order to better reach poorly-served populations (e.g., certain geriatric populations), improve agency responsiveness, and reduce pendency. The administrative application may selectively activate one or more instantiations of field examinations applications in order to combat illicit use and improper issuance. Indeed, the activation of a field examination application may involve the verification of scores of security compliance features before the field examination application can be confidently administered. For example, a camera may be configured to only capture imagery for the field examination application, all other TCP/IP stacks to other non-issuing devices may eliminated, and non-issuing functionality may be disabled as a result of activating the field examination application.

Still, other cases may facilitate the ability of affected users to use a mobile device to complete one or more constituent portions in advance. For example, an affected user may be allowed to complete one or more portions of the form. When the user arrives at an enrollment center, the user may user register, for example, by electronically "checking in" to indicate their presence on site and desire for service. An administrative application may perceive the state of one or more users having partially completed their enrollment and manage the configuration of examiner stations to better support workflow responsive to this capability. For example, if a specified proportion of users has partially completed an enrollment process and only requires minimal processing beyond in-person verification through biometrics, photo capture, and printing, the administrative application may suggest a revised technical configuration whereby certain examination stations are reconfigured to support these more focused tasks. Further, each of the examination stations may be configured to automatically receive access to a copy of the partially-completed application so that an examiner can review key elements, perform required biometric and liveness tests, capture an accredited image, and generate an object that is sent to an accredited printer.

Figure 10:
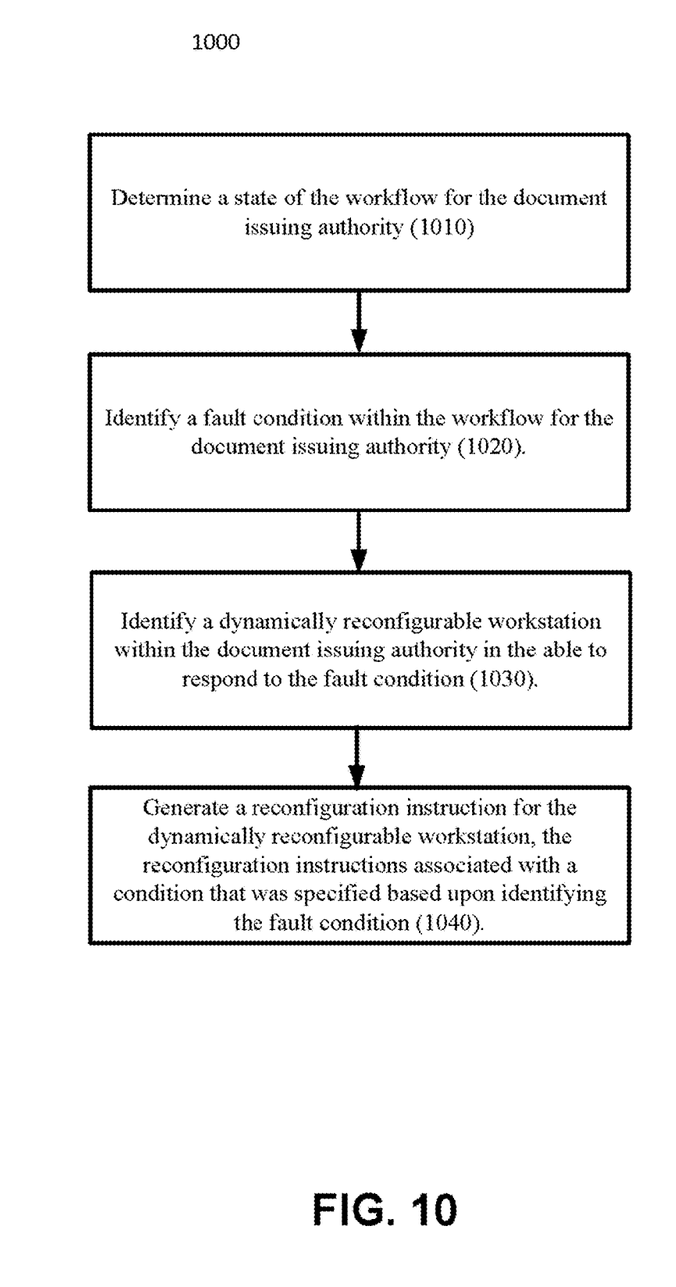
FIG. 10 is a flow chart of a process by an administrator of an identification document issuing authority is enabled to configure one or more workstations in a workflow.

FIG. 10 is a flow chart of a process by an administrator of an identification document issuing authority is enabled to configure one or more workstations in a workflow. Such a sequence of steps may be required to dynamically reconfigure the settings on one or more examination stations within a document issuance authority where each of the examination stations may be configured to support one or more constituent tasks. The method may be performed, for example, using a processor configured to interface with one or more reconfigurable workstations in a workflow across a network, the workflow performing one or more designated issuing functions required to issue an identification document by a document issuing authority.

Initially, a processor determines a state of the workflow for the document issuing authority (1010). For example, an administrator application may receive inputs from a queue management system that gives an administrator visibility into the state of examination at a document issuing authority. An administrator may view a queue state and see that a document printing station is associated with more than a threshold expected wait time and/or is supporting more than a threshold size of queue. In one configuration, the administrator application may receive multiple inputs directly from the examination stations and make a queue state determination in response to receiving various inputs. In another configuration, the administrator application may interface with a queue management system that serves registration point for a document issuing authority. The registration point may include a greeting workstation where visitors to a document issuing authority establish a presence at a facility and become assigned to one or more constituent tasks and/or kiosks based on their particular requirements. The queue management system may include an electronic tracking system such that a visitor electronically checks into one or more kiosks and/or examination stations. A wireless device may use short-range wireless networking technology (e.g., Bluetooth Low Energy) to verify a presence at one or more kiosks and/or examination stations.

The processor identifies a fault condition within the workflow for the document issuing authority (1020). For example, an administrator application may receive a message that a document printer is unable to print. Even with more than one printer, the fault condition may cause a tremendous disruption that injects delays to more than a specified threshold.

The processor identifies a dynamically reconfigurable workstation within the document issuing authority in the able to respond to the fault condition (1030). For example, the administrator application may determine that an examination kiosk (i.e., an examination workstation) used for image capture may be reconfigured to support printing capability.

The processor generates a reconfiguration instruction for the dynamically reconfigurable workstation, the reconfiguration instructions associated with a condition that was specified based upon identifying the fault condition (1040). Specifically, the processor may configure an image capture kiosk into a printing kiosk. The suite of applications offered on the kiosk may be modified to remove access to image capture capability and instead offer printing components and document retrieval capability. In order to facilitate document retrieval, the kiosk may be configured to optically read a printed bar code, read biometric information (e.g., a facial profile and/or fingerprint information), or use short-range wireless technologies in order to verify an identity of a person requesting to receive an identification document. Other implementations are within the scope of the following claims.

What is claimed is:

1. A computer system enabling an administrator of an identification document issuing authority to configure one or more workstations in a workflow for performing one or more designated issuing functions required to issue a physical identification document, the computer system comprising:

a processor configured to interface with one or more reconfigurable workstations in a workflow across a network, the workflow for performing one or more designated issuing functions required to issue, to a user, a physical identification document by a document issuing authority; and instructions embodied on a computer readable medium than when executed by the processor cause the processor to perform steps that include:

determine a state of the workflow for performing the one or more designated issuing functions required to issue, to the user, the physical identification document by the document issuing authority;

based on determining the state of the workflow for performing the one or more designated issuing functions required to issue, to the user, the physical identification document, identify a fault condition within the workflow for performing the one or more designated issuing functions required to issue, to the user, the physical identification document by the document issuing authority; and in response to identifying the fault condition within the workflow for performing the one or more designated issuing functions required to issue, to the user, the physical identification document:

identify a dynamically reconfigurable workstation within the document issuing authority that is able to respond to the fault condition; and generate, for the dynamically reconfigurable workstation, a reconfiguration instruction to issue, to the user, a temporary electronic identification document on a mobile device of the user.

2. The computer system of claim 1 wherein identifying the fault condition includes detecting that an examination application is no longer employing a required security setting.

3. The computer system of claim 1 wherein identifying the fault condition includes detecting that a peripheral device associated with an examination application is no longer operative.

4. The computer system of claim 1 wherein the reconfiguration instruction includes an instruction for the mobile device to interface with a medical records system.

5. The computer system of claim 1 wherein the reconfiguration instruction includes an instruction for the mobile device to present authentication credentials configured to align with a centrally-verifiable record in response to interrogating authentication credentials.

6. The computer system of claim 1 wherein determining the state of the workflow for performing the one or more designated issuing functions required to issue, to the user, the physical identification document by the document issuing authority includes:

determining whether one or more users have participated in a pre-enrollment registration process, and accounting for the impact of the participation in the pre-enrollment registration in determining the state of the workflow for performing the one or more designated issuing functions required to issue, to the user, the physical identification document.

7. The computer system of claim 1 wherein identifying the dynamically reconfigurable workstation within the document issuing authority that is able to respond to the fault condition includes identifying an examination station that is configured to invoke one of several examination configurations.

8. A method of enabling an administrator of an identification document issuing authority to configure one or more workstations in a workflow for performing one or more designated issuing functions required to issue a physical identification document, the method comprising:

using a processor configured to interface with one or more reconfigurable workstations in a workflow across a network, the workflow for performing one or more designated issuing functions required to issue, to a user, a physical identification document by a document issuing authority;

determining a state of the workflow for performing the one or more designated issuing functions required to issue, to the user, the physical identification document by the document issuing authority;

based on determining the state of the workflow for performing the one or more designated issuing functions required to issue, to the user, the physical identification document, identifying a fault condition within the workflow for performing the one or more designated issuing functions required to issue, to the user, the physical identification document by the document issuing authority; and in response to identifying the fault condition within the workflow for performing the one or more designated issuing functions required to issue, to the user, the physical identification document:

identifying a dynamically reconfigurable workstation within the document issuing authority that is able to respond to the fault condition; and generating, for the dynamically reconfigurable workstation, a reconfiguration instruction to issue, to the user, a temporary electronic identification document on a mobile device of the user.

9. The method of claim 8 wherein identifying the fault condition includes detecting that an examination application is no longer employing a required security setting.

10. The method of claim 8 wherein identifying the fault condition includes detecting that a peripheral device associated with an examination application is no longer operative.

11. The method of claim 8 wherein the reconfiguration instruction includes an instruction for the mobile device to interface with a medical records system.

12. The method of claim 8 wherein the reconfiguration instruction includes an instruction for the mobile device to present authentication credentials configured to align with a centrally-verifiable record in response to interrogating authentication credentials.

13. The method of claim 8 wherein determining the state of the workflow for performing the one or more designated issuing functions required to issue, to the user, the physical identification document by the document issuing authority includes:

determining whether one or more users have participated in a pre-enrollment registration process, and accounting for the impact of the participation in the pre-enrollment registration in determining the state of the workflow for performing the one or more designated issuing functions required to issue, to the user, the physical identification document.

14. The method of claim 8 wherein identifying the dynamically reconfigurable workstation within the document issuing authority that is able to respond to the fault condition includes identifying an examination station that is configured to invoke one of several examination configurations.

* * * * *